(12) United States Patent
Kovent (10) Patent No.: US 10,957,887 B2
(45) Date of Patent: *Mar. 23, 2021

(54) EXPANDABLE BATTERY MODULE

(71) Applicant: EMATRIX ENERGY SYSTEMS, INC., Auburn Hills, MI (US)

(72) Inventor: Idan David Kovent, Huntington Woods, MI (US)

(*) Notice: Subject to any disclaimer, the term of this patent is extended or adjusted under 35 U.S.C. 154(b) by 55 days.

This patent is subject to a terminal disclaimer.

(21) Appl. No.: 16/202,620

(22) Filed: Nov. 28, 2018

(65) Prior Publication Data

US 2019/0097193 A1 Mar. 28, 2019

Related U.S. Application Data

(63) Continuation of application No. 15/016,359, filed on Feb. 5, 2016, now Pat. No. 10,170,741.

(51) Int. Cl.
| | |
|---|---|
| H01M 2/10 | (2006.01) |
| H01M 10/6556 | (2014.01) |
| H01M 10/6567 | (2014.01) |
| H01M 10/625 | (2014.01) |
| H01M 10/627 | (2014.01) |
| H01M 10/613 | (2014.01) |
| H01M 2/20 | (2006.01) |
| H01M 10/647 | (2014.01) |

(52) U.S. Cl.
CPC ........ *H01M 2/1077* (2013.01); *H01M 2/206* (2013.01); *H01M 10/613* (2015.04); *H01M 10/625* (2015.04); *H01M 10/627* (2015.04); *H01M 10/6556* (2015.04); *H01M 10/6567* (2015.04); *H01M 2/105* (2013.01); *H01M 10/647* (2015.04); *H01M 2220/10* (2013.01); *H01M 2220/20* (2013.01)

(58) Field of Classification Search
None
See application file for complete search history.

(56) References Cited

U.S. PATENT DOCUMENTS

| | | | |
|---|---|---|---|
| 6,400,122 B1 | 6/2002 | Iwamura | |
| 10,170,741 B2 * | 1/2019 | Kovent | H01M 2/1077 |
| 2009/0155680 A1 * | 6/2009 | Maguire | H01M 2/1077 |
| | | | 429/158 |
| 2012/0183823 A1 | 7/2012 | Von Borck | |
| 2013/0295435 A1 | 11/2013 | Vu | |
| 2014/0079981 A1 * | 3/2014 | Sheen | H01M 2/1077 |
| | | | 429/156 |
| 2014/0287288 A1 | 9/2014 | Takeda | |
| 2015/0210184 A1 | 7/2015 | Sun | |
| 2016/0301038 A1 | 10/2016 | Modest | |

* cited by examiner

*Primary Examiner* — Christopher P Domone
(74) *Attorney, Agent, or Firm* — Gutwein Law; Tyler Droste (57) ABSTRACT

A battery module comprising sub-module components, or bricks, that facilitate efficient assembly utilizing common hand tools and provide integrated cooling features for increased battery configurability and performance.

20 Claims, 13 Drawing Sheets

EXPANDABLE BATTERY MODULE

CROSS REFERENCE TO RELATED APPLICATION

This U.S. Patent Application is a continuation to U.S. Non-Provisional application Ser. No. 15/016,359 filed Feb. 5, 2016, the disclosure of which is considered part of the disclosure of this application and is hereby incorporated by reference in its entirety.

FIELD OF THE INVENTION

This invention relates generally to an expandable battery module, specifically having physical features that facilitate physical and electrical connectivity.

BACKGROUND

It is known in the electronics industry to use battery packs to store and subsequently supply energy to an electrical system. In traditional applications, batteries either customizes to particular applications, or multiple batteries are combined in a manner to provide the desired electrical characteristics. Typically, combining multiple batteries requires external connections, such as jumper tabs, soldered wiring, or welding. Commonly, battery assemblies are formed using automated processes that typically require a high level of control and repeatability, which also requires frequent calibration.

Battery systems may be used to provide power in a wide variety of applications. Examples of transportable applications include hybrid electric vehicles (HEV), plug-in HEVs, and electric vehicles (EV). Examples of stationary applications include backup power for telecommunications systems, uninterruptible power supplies (UPS), and distributed power generation applications.

Examples of the types of batteries that are used include nickel metal hydride (NiMH) batteries, lead-acid batteries, lithium batteries, lithium-ion batteries, and other types of batteries in a cylindrical form factor. A battery module includes a plurality of cells that are connected in series, parallel, or a combination thereof. The modules themselves may be connected in series, parallel, or a combination thereof in forming a complete battery pack.

Battery system integration poses multiple challenges in various disciplines. Most of the cost of a battery system lies with the battery cells. However assembly defects, such as, for example, misaligned welds, can result in expensive recalls wherein there is no opportunity to reuse the cells. Also, in low cost manufacturing markets, which can be large producers and consumers of battery packs, battery systems are prone to quality issues as their manufacturing techniques rely heavily on manual assembly processes. An error-proof, manual assembly design that can easily be automated is key for successful production.

When fasteners are used to connect bus bars to battery cells, a large size battery pack can end up with thousands of fasteners, all which must be torqued down to the correct torque value with the risk of vibrations loosening a metal fastener that can cause a short.

Modules are often externally connected by bus bars or cables, with cables being a cheaper option. However cables must be restrained to prevent loosening of the fasteners and chafing of the cables against other parts of the battery system. To restrain the cables at the lug terminal connecting it to the module, a two-hole lug terminal is commonly employed. To keep all modules the same, this requires all module-connecting bus bars to also have two holes, which doubles the amount of fasteners used in a battery pack and introduces added complexity to the bus bars used. The invention offers a built-in lug terminal restraint, saving the extra fastener.

Manufacturers of battery modules are always facing the dilemma of making small, highly-configurable modules versus large, well-integrated modules. The smaller modules offer more packaging options and can meet more diverse market demands. But the larger modules are more highly integrated, increasing the overall power to mass/volume and energy to mass/volume ratios by, in part, reducing the number of fasteners, mounting brackets and cables or complex bus bars. Aside from constrained packaging, the other issue with large format modules is the cost of replacement since the entire module is typically replaced.

The present invention is directed to overcome one or more of the problems as set forth above.

DETAILED DESCRIPTION

The present disclosure is directed to a battery module design that allows the complete manual assembly of the battery module from smaller battery sub-modules or bricks utilizing integral mating members that obviate the need for automated electrical and mechanical joining processes. Traditionally, automated processes have been perceived as having better quality control than manual assembly, but the battery module design disclosed herein achieves consistent quality of the final battery assembly with robust mechanical and electrical connections. The battery assembly does not require any welding or other high-accuracy automated processes. The invention does not require any welding or any high accuracy automated process. The battery module further comprises an integrated lug terminal restraint, thereby reducing the number of fasteners used in the final battery system.

The battery sub-module is a small-format, self-contained module, called a brick, that comprises the connection mechanism to the adjoining bricks. Bricks may be electrically connected in series or parallel using a flat, rectangular bus bar with minimum fasteners required. A battery module is then the assembly of multiple bricks, with power:mass, power:volume, energy:mass, energy:volume that are very similar to those of an individual brick.

Each brick is common design and construction as other bricks, wherein the only distinction is with respect to the battery module's bottom and top covers. The bottom cover secures the final negative busbar that is sandwiched by the bottom cover and a plastic spacer that secures the battery cells. A layer of cells is oriented in plastic spacer holes, and the battery brick is created by alternating subsequent spacer-busbar-spacer layers with additional battery cell layers. The top and bottom covers may be bonded to the external enclosure using adhesive.

Such a construction with alternating layers as described above facilitates direct manual assembly. The bottom and top of the plastic holders have matching pins and holes to lock the bus bar in place. Holes in the perimeter allow the use of hand-applied snap rivets to lock the two plastic holders together. Channels through the spacers and bus bars allow air flow paths for cooling or heating. The holders also contribute structural rigidity to the thin bus bar.

The bus bars are connected to the cells by compression pressure that is applied through the layers from the top and bottom covers. One side of the bus bars has a spring to maintain contact with the positive terminals of the cells. Deflection of these springs is limited by plastic spacers that are located between the holders. The spacers also provide support for the bus bar tab for external connection and threads for the fastener used on that connection.

Figure 13:
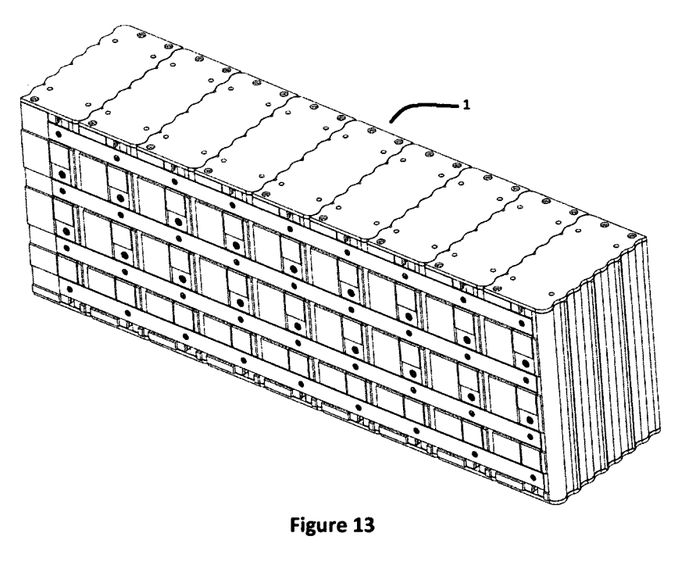
FIG. 13 is an isometric view of a battery module illustrating an assembly of bricks [1].

FIG. 13 illustrates a battery module is built from multiple battery bricks [1]. The bricks are mechanically interlocked to each other using interlocking pins [10] and cavities [9] on sides of the bricks. If an electrical parallel connection is required, all four parallel layer terminals [2] are connected between bricks via flat, rectangular bus bars that run through lug terminal restriction channels [3]. If an electrical series connection is required, bricks are connected through top and bottom parallel layer terminals only. In this aspect, the first brick will have cells oriented such that positive terminals are facing upward, the second brick will have cells oriented such that the negative terminals are facing upward, with subsequent layers alternating such that the positive and negative terminals of battery cells are mated to one another.

In an optional embodiment, if a cable connection is required to a different module or component, a single-hole lug terminal is used with a lug terminal width sized to fit in lug terminal restriction channel [3] to prevent it from rotating. In one embodiment, all parallel layer terminal connections utilize mechanical fasteners, such as for example bolts. In this embodiment, threads of the mechanical fasteners are mated into threaded holes in threaded spacer [26].

Figure 1:
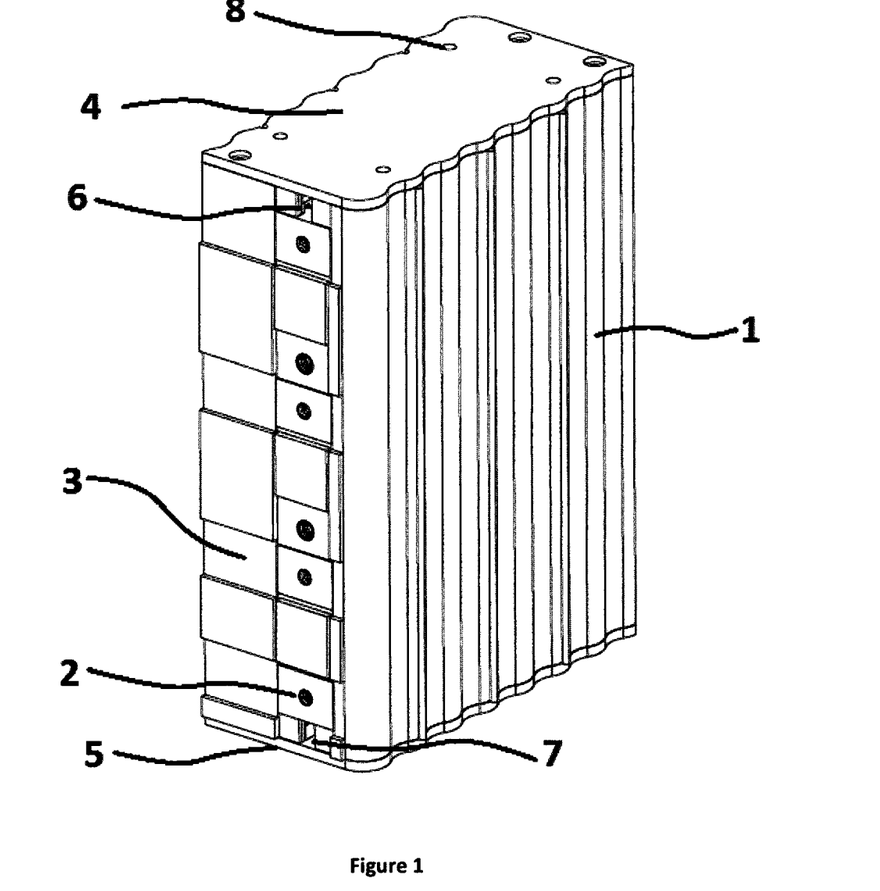
FIG. 1 is an isometric view of a battery brick [1] showing parallel layer terminal [2], lug terminal restriction channel [3], dispenser [4], collector [5], flow entrance point [6], flow exit point [7] and brick-to-brick connecting peg hole [8].
Figure 2:
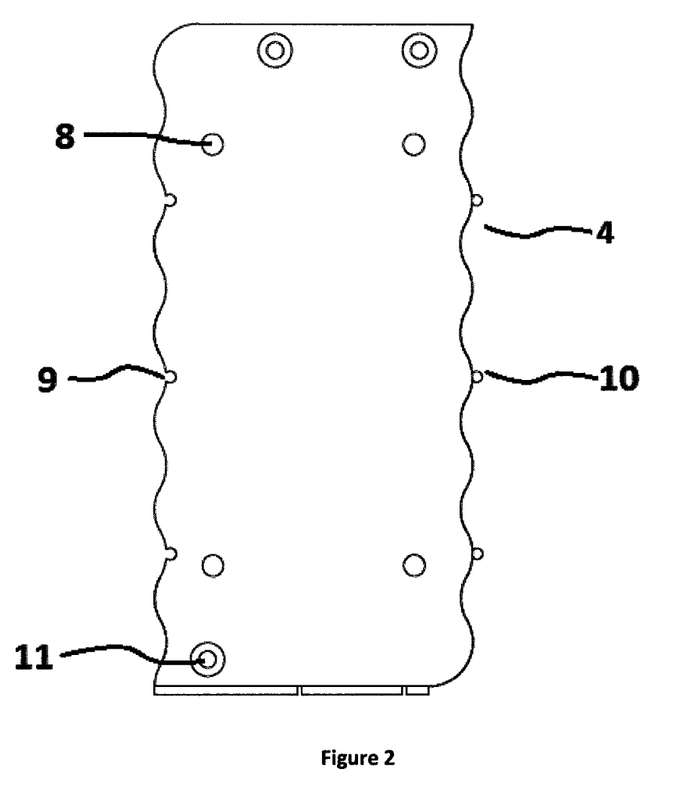
FIG. 2 is a top view of a dispenser [4] illustrates brick-to-brick connecting peg hole [8], brick-to-brick interlocking cavity [9], brick-to-brick interlocking pin [10] and plastic-to-plastic fastening hole [11].
Figure 3:
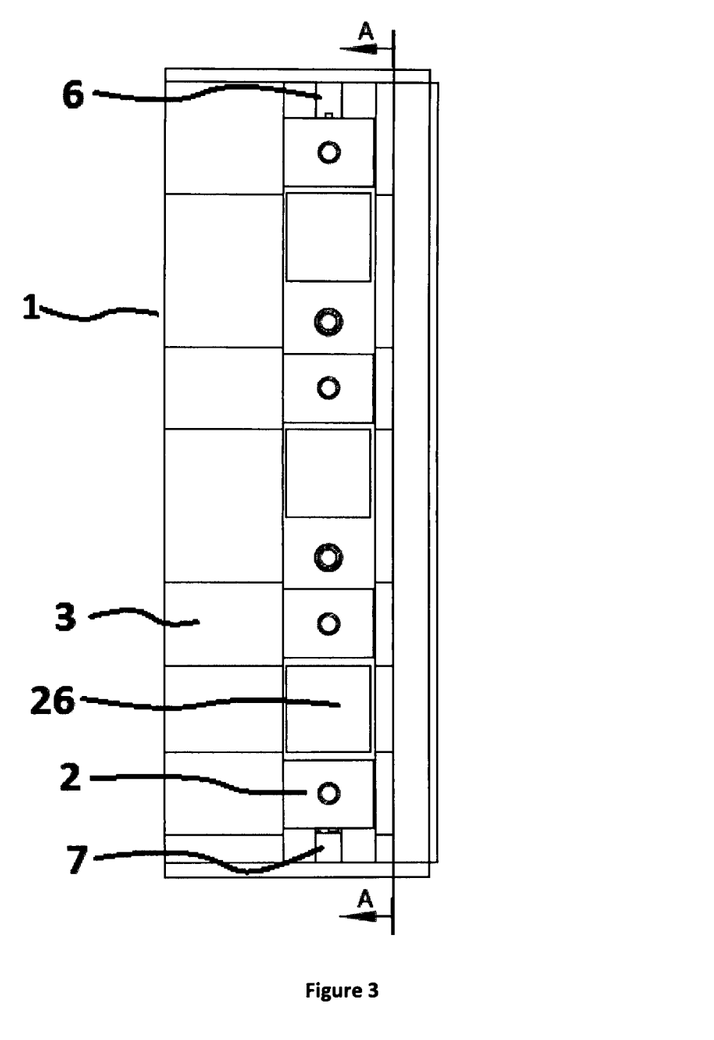
FIG. 3 is a front view of a battery brick [1] illustrates parallel layer terminal [2], lug terminal restriction channel [3], flow entrance point [6], flow exit point [7] and threaded spacer [26].
Figure 6:
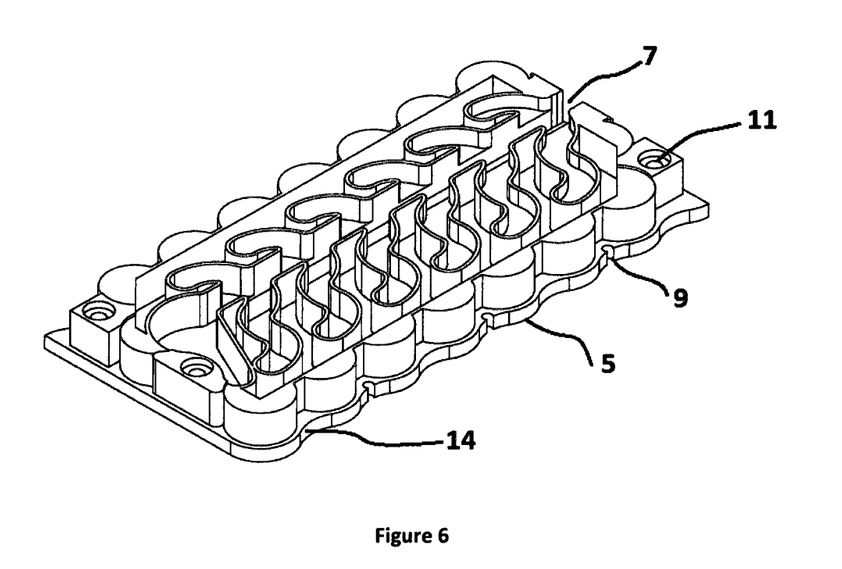
FIG. 6 is an isometric view of collector [5] illustrates flow exit point [7], brick-to-brick interlocking cavity [9], plastic-to-plastic fastening hole [11] and stepped cover [14].

Bricks may also be assembled on top of each other. In this aspect, pegs are installed in brick-to-brick connecting peg holes [8] on top of dispenser [4] the collector [5] of the module on top has matching holes [8] to lock both modules together in a horizontal plane. The bottom brick is locked to a battery pack box by similar pegs located on a floor of the battery pack box. To prevent vertical movement, down pressure can be applied on the top brick by the battery pack box cover. The bricks can also be mounted on a side if matching interlocking features are used on the floor of the battery pack box.

Figure 4:
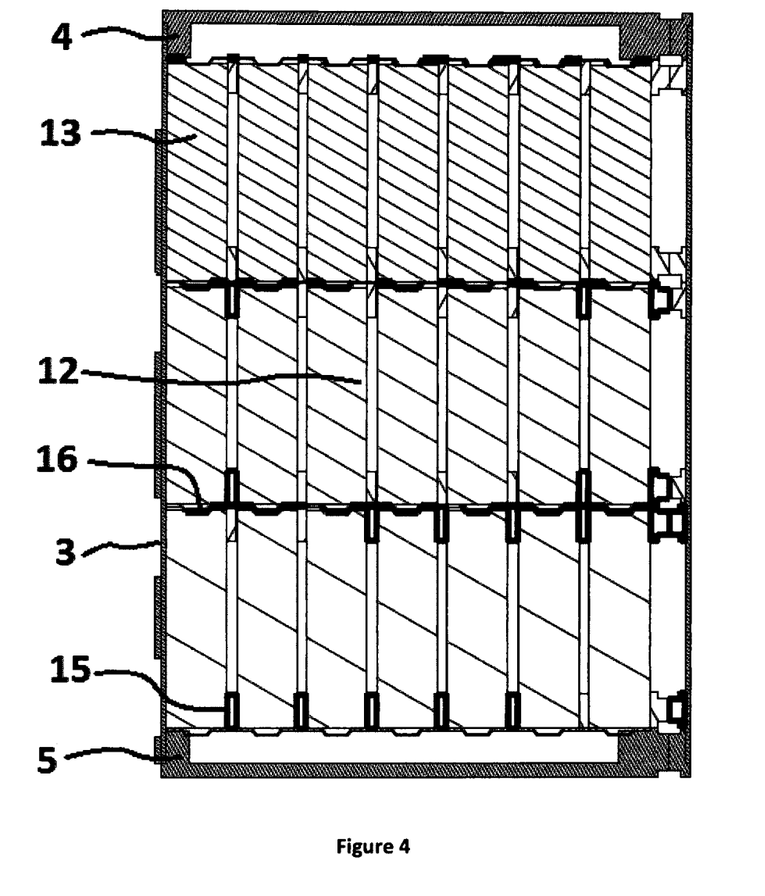
FIG. 4 is a cut-section A-A (shown in FIG. 3) illustrates lug terminal restriction channel [3], dispenser [4], collector [5], parallel layer of cells [12], battery cell [13], plastic holder [15] and bus bar [16].
Figure 7:
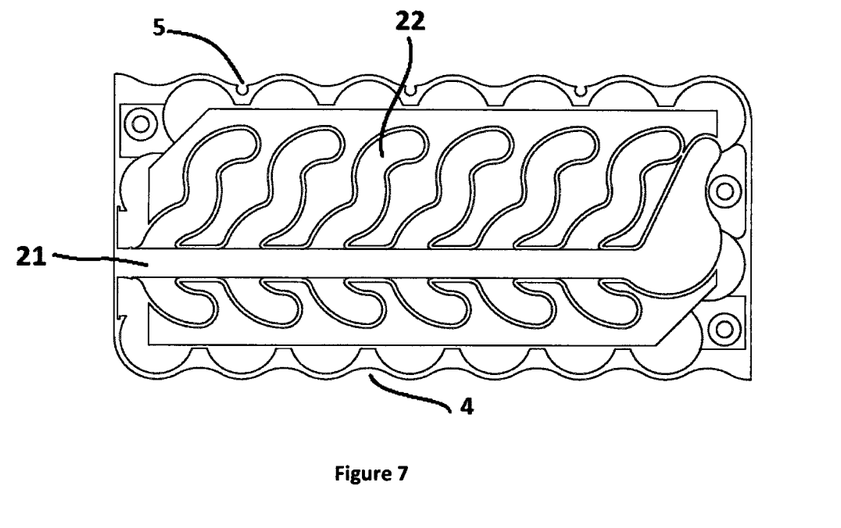
FIG. 7 is a top view of collector [5] or bottom view of dispenser [4] illustrates manifold primary flow channel [21] and manifold secondary flow channel [22].

The top cover and bottom cover of the battery brick have the same internal design. The top cover is also used as dispenser [4], inlet manifold for the brick. A flow entrance point [6] allows a cooling medium to enter the battery module and flow through primary flow channel [21] where it splits to different secondary flow channels [22]. The secondary flow channels have different cross section to ensure equal pressure through all flow channels. The cooling medium then passes through bus bar flow passages [23] and through plastic holder flow passages [18]. The cooling medium continues to flow in parallel to a first layer of cells [12]. The cooling medium then passes through flow passages in a plastic holder-busbar-plastic holder sandwich, another layer of cells, another sandwich and another layer. At the bottom of a third layer, the cooling medium flows through the flow passages [23] in a lower-most busbar and collected at a cooling medium collector [5]. The bottom cover may also optionally be used as the cooling medium collector [5], in an exhaust manifold of the brick. The cooling medium may be collected through secondary flow channels [22] to the primary flow channel [21] and exits the cooling medium collector [5] at a flow exit point [7]. An exemplary cooling flow path is illustrated in FIGS. 4, 6 and 7.

Figure 5:
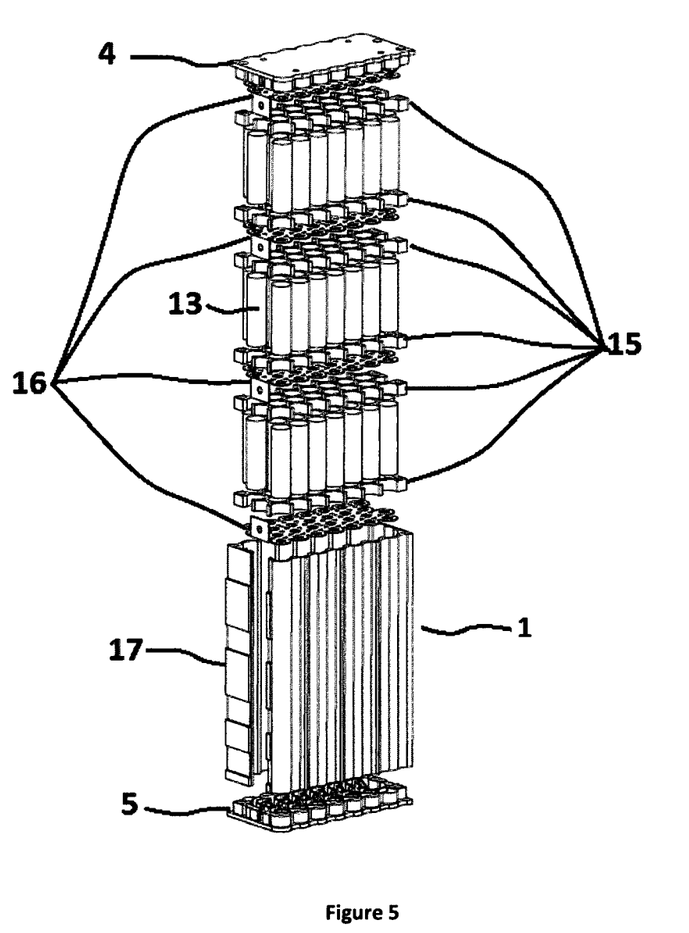
FIG. 5 is an exploded view of a battery brick [1] illustrates dispenser [4], collector [5], battery cell [13], plastic holder [15] and bus bar [16] and external enclosure [17].
Figure 8:
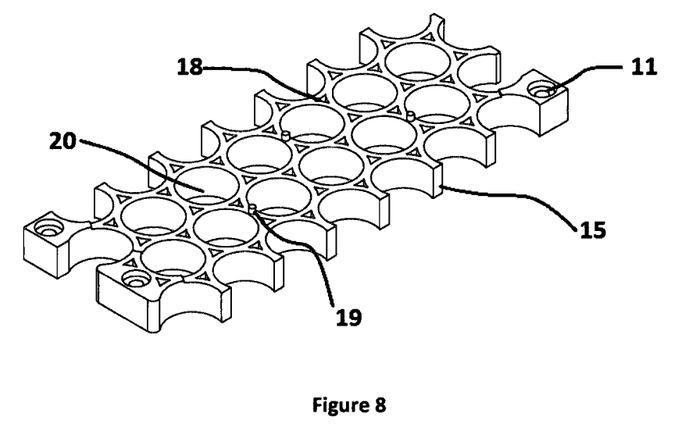
FIG. 8 is an isometric view of plastic holder [15] illustrates plastic-to-plastic fastening hole [11], flow passage through holder [18], sandwich locator [19] and cell cavity [20].
Figure 9:
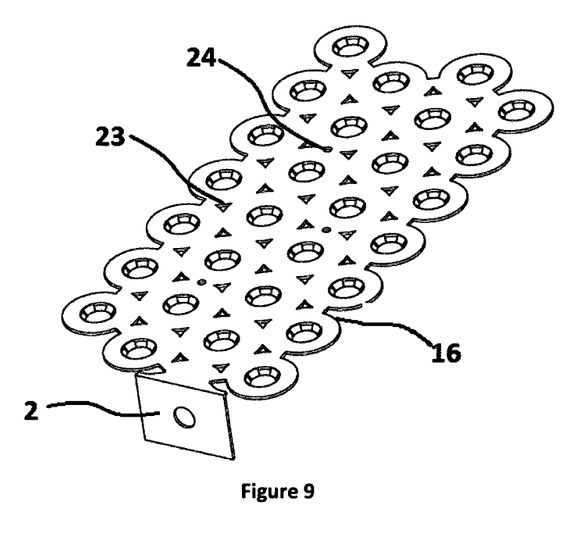
FIG. 9 is an isometric view of bus bar [16] illustrates parallel layer terminal [2], flow passage through bus bar [23] and sandwich locator hole [24].
Figure 10:
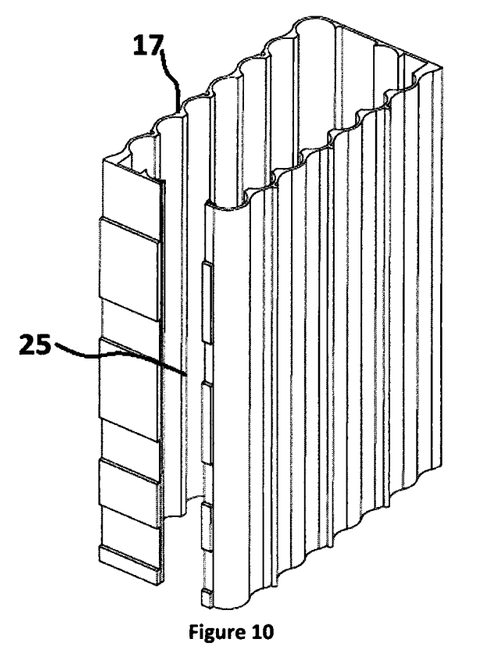
FIG. 10 is an isometric view of external enclosure [17] illustrates terminals slot [25].
Figure 11:
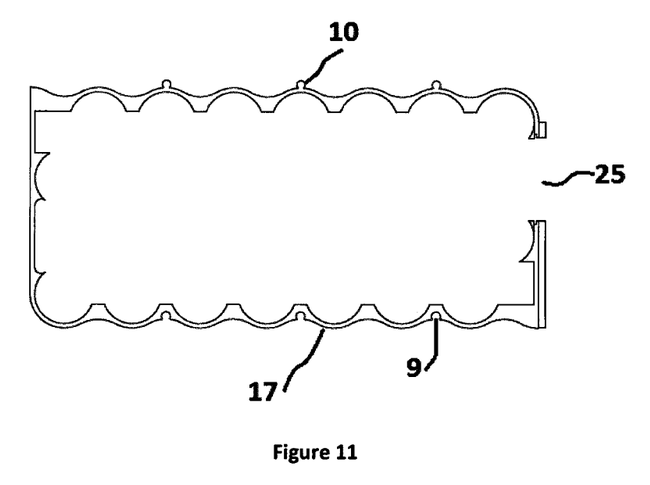
FIG. 11 is a top view of external enclosure [17] illustrates brick-to-brick interlocking cavity [9], brick-to-brick interlocking pin [10] and terminals slot [25].
Figure 12:
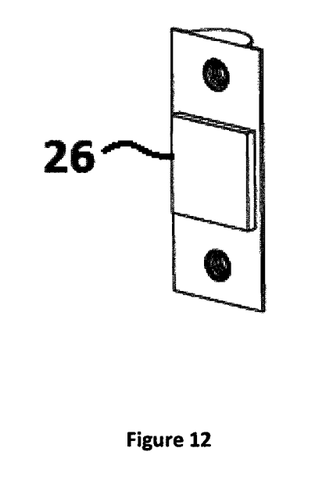
FIG. 12 is an isometric view of threaded spacer [26].

A structure as disclosed herein with alternating layers of battery cells and busbars protects busbar [16] from damage, secures the cells [13] against the busbar terminals, and maintains a desired spacing distance between them. The spacing distance is necessary to prevent propagation of heat damage from one cell to the next. The bottom sandwich in the brick consists of layers of collector [5]—busbar [16]—plastic cell holder [15]. The top sandwich in the brick comprises layers of dispenser [4]—busbar [16]—plastic cell holder [15]. The internal layers comprise alternating layers of cell holder [15]—busbar [16]—cell holder [15]. The top of plastic structural parts may comprise locator pins [19], which go through locator holes in busbar [24] that ensure correct positioning. The bottom of the plastic parts further comprises locator holes that match the location of the locator pins. The pins are then positioned in the locator holes to finalize the positioning of the plastic components, the busbar, and the cells, which are then locked together using an external fastener, such as, for example, hand-applied plastic snap rivets through plastic-to-plastic fastening holes [11] in the plastic cell holders [15].

The assembly of brick [1] is best illustrated by FIG. 5. The bottom sandwich described above is the base of the brick. External enclosure [17] is bonded to stepped bottom cover [14]. Cells [13] are installed in each cavity of cell holder [15] to create a parallel layer [12]. A threaded spacer [26] slides through a terminal slot. Another spacer slides onto a second end of brick [1] to fill a gap between cells [13] and an external enclosure [17]. Spacers [26] limit deflection of busbar cell tabs, ensuring the weight of the cells from layers above does not apply stress on a given layer. Threaded spacers [26] on slot side [25] receive the fasteners used to connect external bus bars or lug terminals to the parallel layers' terminals [2]. An internal sandwich installed on top of the cells' layer [12] where parallel layer terminal [2] slides through a terminal slot [25]. A second set of spacers [26] may also be installed. A second layer of cells may be installed with a second internal sandwich proximate thereto. Further, a third layer of cells [13] and spacers [26] are installed with a top sandwich closing the brick. Stepped top cover [14] is bonded to the external enclosure supplying necessary pressure on the internal parts to create a required mechanical contact of cells and bus bars. If a cell is misaligned or a contamination exists between the layers, a gap will exist between the top cover and the external enclosure. The gap is a sign for a defect in assembly.

Battery bricks may be mated together side by side by interlocking sliders on along their length. The flat bus bars connecting each layer supply more structural rigidity.

The module may be entirely hand-assembled with fasteners used only for external connections and no welds needed. Adhesive is only applied between plastic pieces without special, highly conductive or high temperature adhesive is needed.

The module may be expanded as needed for practically unlimited parallel and series configurations. New layers can be added to increase the number of series elements, new bricks can be attached side-by-side to increase the number of parallel or series elements.

If the module design of the present disclosure were to be used in a system design including liquid cooling, the liquid cooling medium must be electrically insulating as it touches the bus bars.

When cooling a battery module, added structure or material is needed to support the cooling media. The bricks are designed to integrate cooling flow channels and manifolds, reducing the need for additional elements in the module design. Each brick has its own cooling medium inlet and outlet, and the overall module system may incorporate manifolds to dispense the air flow to various bricks.

If sealing is needed, the greatest leak-potential points are parallel layer terminals. A rubber seal ring can be applied around the busbar section leading to these terminals. Adhesive seal can be applied along the terminal's slot.

The plastic structure is used for electrical isolation and creates thermal insulation, thereby inhibiting the propagation of thermal events. Highly thermally conductive plastic may be used. The external enclosure may be made of metal such as aluminum.

If a more integrated design is required and the packaging of the pack allows, a brick design can easily be modified to include all parallel elements in a single brick. The number of series elements, i.e. layers, is limited by the height limit of the pack and the pressure required to push the cooling media through the layers. Theoretically the entire pack can be assembled into a single brick.

What is claimed is:

1. A battery brick configured for mating with external components comprising:
   a first battery cell and a second battery cell, wherein the first battery cell and second battery cell are arranged as a first parallel layer of cells;
   a bottom cover and a top cover;
   a first mechanical mating member having at least one cooling medium flow passage and a locating member, wherein the mechanical mating member is configured to restrict the movement of the first battery cell and the second battery cell;
   a first electrical mating member having a parallel layer terminal and a locator aperture,
      wherein the first electrical mating member is configured to provide access to any series elements of the brick and allow parallel connections and voltage sensing of each series element with a single fastener;
      wherein the mechanical mating member and electrical mating member are configured to interface with a second mechanical mating member and second electrical mating member of a second battery brick having at least a third battery cell and a fourth battery cell arranged as a second parallel layer of cells.

2. The battery brick of claim 1, further comprising a third electrical mating member having a negative coupling surface and a positive coupling surface configured to connect at least the first battery cell and the second battery cell in parallel at a floor of the brick and connect the first parallel layer of cells and the second parallel layer of cells in series simultaneously.

3. The battery brick of claim 2, wherein said locating member is configured to secure said first electrical mating member between the first mechanical mating member and second mechanical mating member and further align said battery cells against a positive and negative contact of the first electrical mating member, wherein said bottom cover further secure the battery cells of said battery brick.

4. The battery brick of claim 1, wherein the top cover and bottom cover comprises a plurality of brick interlocking pins, brick interlocking cavities, and a terminal slot, wherein said interlocking pins and interlocking cavities are configured to form a coupling means between one or more additional battery bricks on either side of said battery brick.

5. The battery brick of claim 1, wherein said top cover is bonded to said top of the battery brick and the bottom cover is bonded to the bottom portion of the battery brick using an adhesive.

6. The battery brick of claim 1, further comprising a lug terminal restriction element, wherein lug terminal restriction element is part of said mechanical mating member, wherein said lug terminal restriction element is configured to prevent rotation of a terminal lug configured to locate the lug terminal behind the parallel layer terminal, wherein the terminal lug can be attached to the parallel layer terminal with the single fastener.

7. The battery brick of claim 1, wherein said top cover has an inlet and bottom cover has an outlet, wherein the top cover and bottom cover have a first set of flow channels and the inlets and outlets are configured to connect to said cooling medium flow passages.

8. The battery brick of claim 1, wherein said cooling medium flow passages further comprises a second set of flow channels, wherein said flow channels are fluidly connected to the first set of flow channels and are configured to provide equal pressure throughout all flow channels.

9. The battery brick of claim 5, wherein said bottom cover and top cover have a stepped ledge configured to fit inside the mechanical mating member and the battery cells are cylindrical in configuration.

10. A battery module comprising:
    a first battery brick and a second battery brick;
    wherein both the first battery brick and the second battery brick include at least one parallel layer comprising:
       at least one battery cell;

a mechanical mating member, wherein said mechanical mating member has at least one cooling medium flow passage and a locating member, wherein the mechanical mating member is configured to restrict the movement of the first battery cell;

a top cover having a flow passage and a bottom cover having a flow passage;

an electrical mating member having a flow passage and a locator aperture, wherein the first electrical mating member is configured to provide access to any series elements of the brick and allow parallel connections and voltage sensing of each series element with a single fastener.

11. The battery module of claim 10, wherein said cooling medium flow passage is configured to be used with a liquid cooling medium.

12. The battery module of claim 11, wherein said first battery brick and second battery brick are interfaced using connecting pegs that connect to peg holes on the top cover or bottom cover.

13. The battery module of claim 10, wherein said top cover has an inlet configured to operate as an inlet manifold for said cooling medium flow passage to the flow passage of the top cover.

14. The battery module of claim 10, wherein said electrical mating member is a busbar having a parallel layer terminal configured to allow for voltage sensing of a single layer within the first battery brick.

15. The battery module of claim 10, wherein said mechanical mating member, top cover, and bottom cover are formed from a polymer.

16. The battery module of claim 10, wherein said first battery brick is mechanically interlocked to said second battery brick, wherein said first battery brick has interlocking pins and said second battery brick has cavities configured to interlock with said interlocking pins.

17. The battery module of claim 14, wherein said busbar has a spring configured to maintain contact with said battery cell.

18. The battery module of claim 16, further comprises a lug terminal configured to electrically couple said first battery brick to said second battery brick, wherein the lug terminal fits within a lug terminal restriction element configured to restrict the rotation of the lug terminal.

19. The battery module of claim 18, further comprising a rubber seal ring applied to said busbar and configured to prevent leaking of a liquid cooling medium out of the top cover and bottom cover.

20. A battery module comprising:

a first battery brick and a second battery brick;

wherein both the first battery brick and the second battery brick comprise:

at least one battery cell;

a connecting layer configured to connect layers of battery cells, comprising:

a mechanical mating member having a plurality of flow passages;

a top cover having a first set of one or more flow channels fluidly connected to a plurality of secondary flow channels, and a bottom cover having second set of one or more flow channels fluidly connected to the mechanical mating member flow channels, wherein said top cover and bottom cover are configured to be mechanically interlocked to the battery module, wherein the flow passages of the mechanical mating member, the flow passages of the electrical mating member, and the flow passages of the top cover and bottom cover are fluidly connected, wherein the secondary channels of the top cover and bottom cover are configured to provide equal pressure though the plurality of flow passages of the battery module; and an electrical mating member having a plurality of flow passages.

* * * * *